US007568817B2

(12) United States Patent
Lee et al.

(10) Patent No.: US 7,568,817 B2
(45) **Date of Patent: *Aug. 4, 2009**

(54) LED LAMP

(75) Inventors: Tsung-Lung Lee, Taipei Hsien (TW); Xu-Hua Xiao, Shenzhen (CN); Li He, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 3 days.

This patent is subject to a terminal disclaimer.

(21) Appl. No.: 11/769,658

(22) Filed: Jun. 27, 2007

(65) Prior Publication Data

US 2009/0002995 A1 Jan. 1, 2009

(51) Int. Cl.
*F21V 29/00* (2006.01)
*B60Q 1/00* (2006.01)
*F21V 7/20* (2006.01)

(52) U.S. Cl. ....................... 362/294; 362/547; 362/345; 362/373; 362/249.02; 362/249.06; 362/249.14

(58) Field of Classification Search ................. 362/294, 362/580, 547, 126, 218, 264, 345, 373
See application file for complete search history.

(56) References Cited

U.S. PATENT DOCUMENTS 7,011,431 B2 * 3/2006 Ono et al. ................... 362/241
7,434,964 B1 * 10/2008 Zheng et al. ................ 362/294
2006/0001384 A1 1/2006 Tain et al.
2006/0028814 A1 * 2/2006 Smith ......................... 362/227
2006/0098439 A1 * 5/2006 Chen .......................... 362/294
2007/0230172 A1 * 10/2007 Wang .......................... 362/249
2007/0253202 A1 * 11/2007 Wu et al. .................... 362/294
2007/0285926 A1 * 12/2007 Maxik ........................ 362/294
2008/0007954 A1 * 1/2008 Li .............................. 362/294
2008/0130299 A1 * 6/2008 Dorogi ....................... 362/373
2009/0040759 A1 * 2/2009 Zhang et al. ................ 362/249

FOREIGN PATENT DOCUMENTS

CN 1359137 A 7/2002

* cited by examiner

*Primary Examiner*—Jong-Suk (James) Lee
*Assistant Examiner*—David J Makiya
(74) *Attorney, Agent, or Firm*—Frank R. Niranjan

(57) ABSTRACT

An LED lamp includes a transparent bulb, an LED module comprising a plurality of LEDs received in an inner space of the bulb, and a heat dissipation apparatus supporting and cooling the LED module. The heat dissipation device includes a heat sink having a hollow base and a plurality of fins extending from the base, a first heat conductor vertically supported by the heat sink, a second heat conductor horizontally mounted on the first heat conductor, and a heat pipe thermally connecting the heat sink, the first heat conductor and the second heat conductor together. The LEDs are positioned on the first heat conductor and the second heat conductor, respectively.

20 Claims, 4 Drawing Sheets

LED LAMP

BACKGROUND OF THE INVENTION

1. Field of the Invention

The present invention relates to an LED lamp, and particularly to an LED lamp having a heat dissipation apparatus for heat dissipation.

2. Description of Related Art

An LED lamp is a type of solid state lighting that utilizes light-emitting diodes (LEDs) as a source of illumination. An LED is a device for transferring electricity to light by using a theory that, if a current is made to flow in a forward direction in a junction comprising two different semiconductors, electrons and holes are coupled at a junction region to generate a light beam. The LED has an advantage in that it is resistant to shock, and has an almost eternal lifetime under a specific condition; thus, the LED lamp is intended to be a cost-effective yet high quality replacement for incandescent and fluorescent lamps.

An LED lamp generally requires a plurality of LEDs, and most of the LEDs are driven at the same time, which results in a quick rise in temperature of the LED lamp. Since generally the LED lamps do not have heat dissipation devices with good heat dissipating efficiencies, operation of the general LED lamps has a problem of instability because of the rapid build up of heat. Consequently, the light from the LED lamp often flickers, which degrades the quality of the illumination. Furthermore, the LED lamp is used in a high heat state for a long time and the life time thereof is consequently shortened.

What is needed, therefore, is an LED lamp which has a greater heat-dissipation capability.

SUMMARY OF THE INVENTION

An LED lamp comprises a bulb, an LED module comprises a plurality of LEDs received in the bulb, and a heat dissipation apparatus supporting and cooling the LED module. The heat dissipation device comprises a heat sink having a hollow base and a plurality of fins mounted on and extending radially outwards from the base, a first heat conductor supported by the heat sink, a second heat conductor mounted on the first heat conductor, and a heat pipe. The heat pipe thermally connects the heat sink, the first heat conductor and the second heat conductor in series. The LEDs are positioned on the first heat conductor and the second heat conductor, respectively. Heat generated by the LEDs is first absorbed by the first and second heat conductors. Then, the heat is transferred to the heat sink for dissipation to surrounding atmosphere via the heat pipe.

BRIEF DESCRIPTION OF THE DRAWINGS

Many aspects of the present LED lamp can be better understood with reference to the following drawings. The components in the drawings are not necessarily drawn to scale, the emphasis instead being placed upon clearly illustrating the principles of the present LED lamp. Moreover, in the drawings, like reference numerals designate corresponding parts throughout the several views.

DETAILED DESCRIPTION OF THE INVENTION

Figure 1:
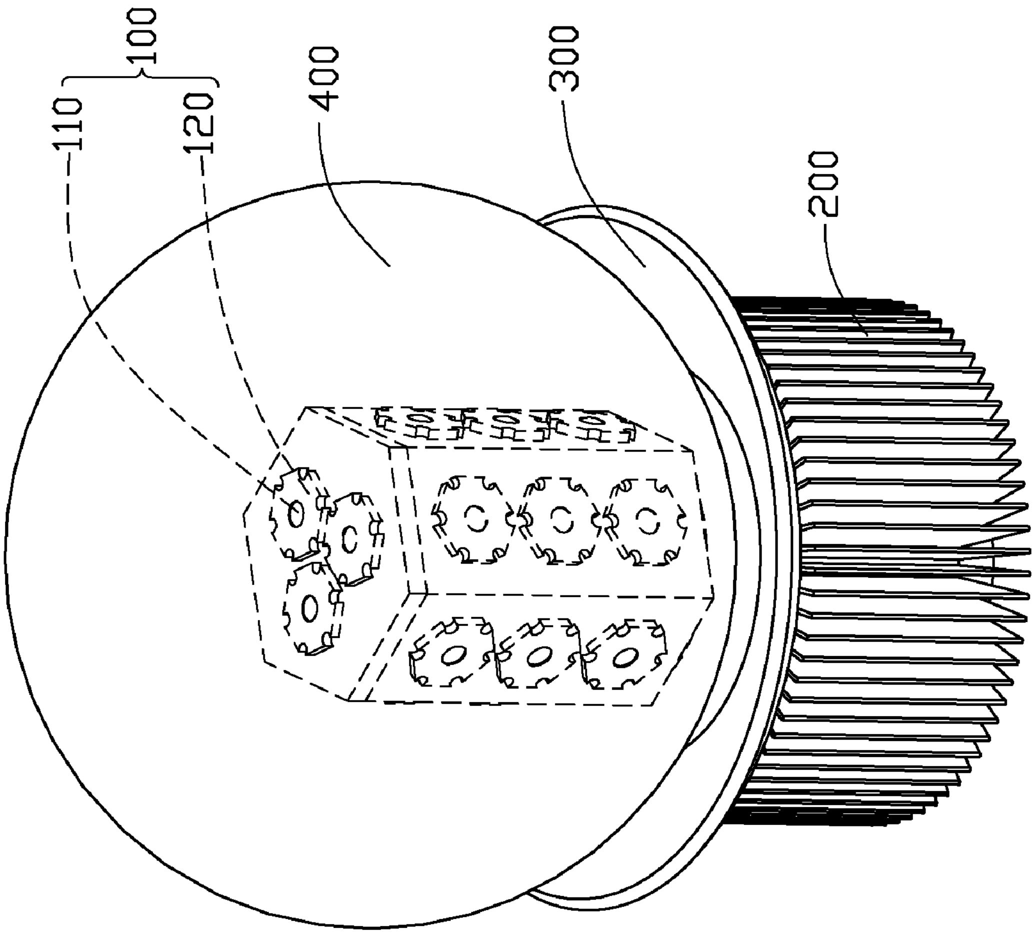
FIG. 1 is an isometric view of an LED lamp in accordance with a preferred embodiment of the present invention, wherein LEDs thereof are shown in dotted lines.
Figure 2:
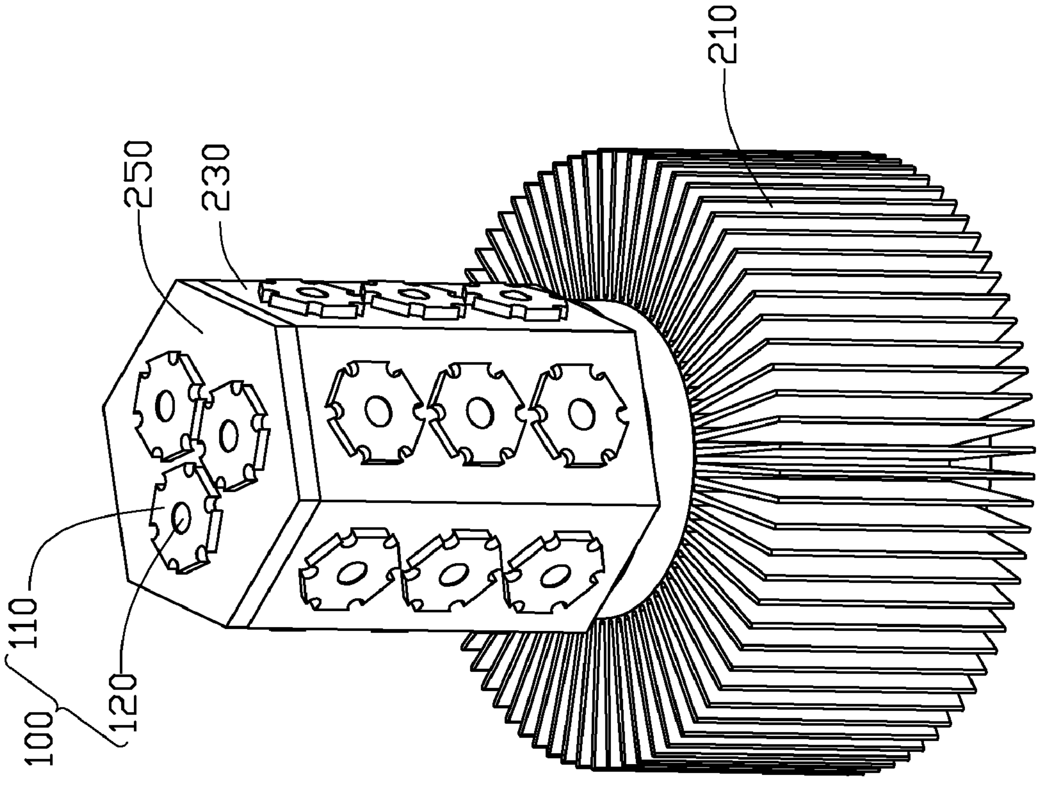
FIG. 2 is similar to FIG. 1, with a bulb and a reflector of the LED lamp of FIG. 1 being removed away.
Figure 3:
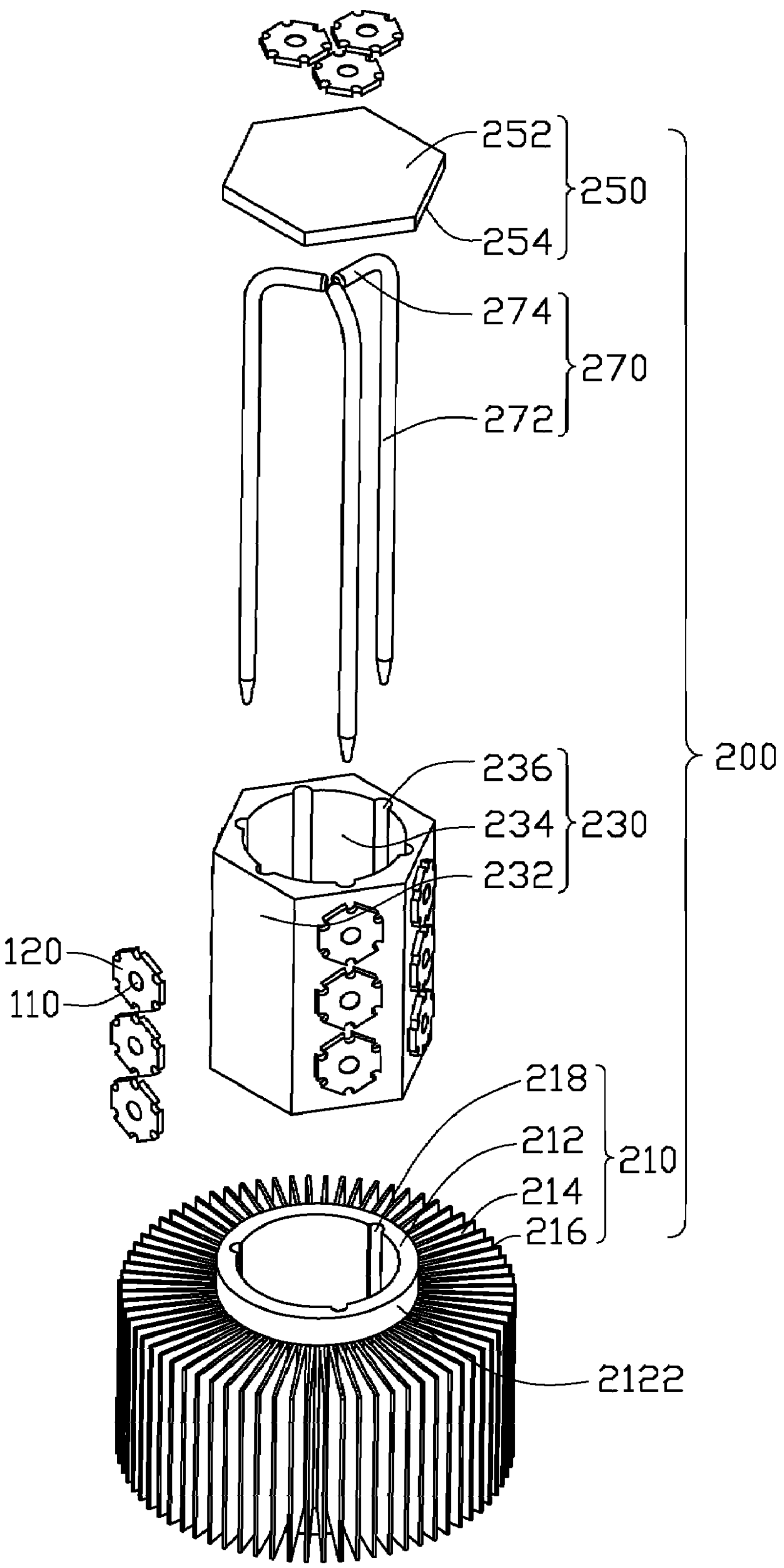
FIG. 3 is an exploded, isometric view of FIG. 2.
Figure 4:
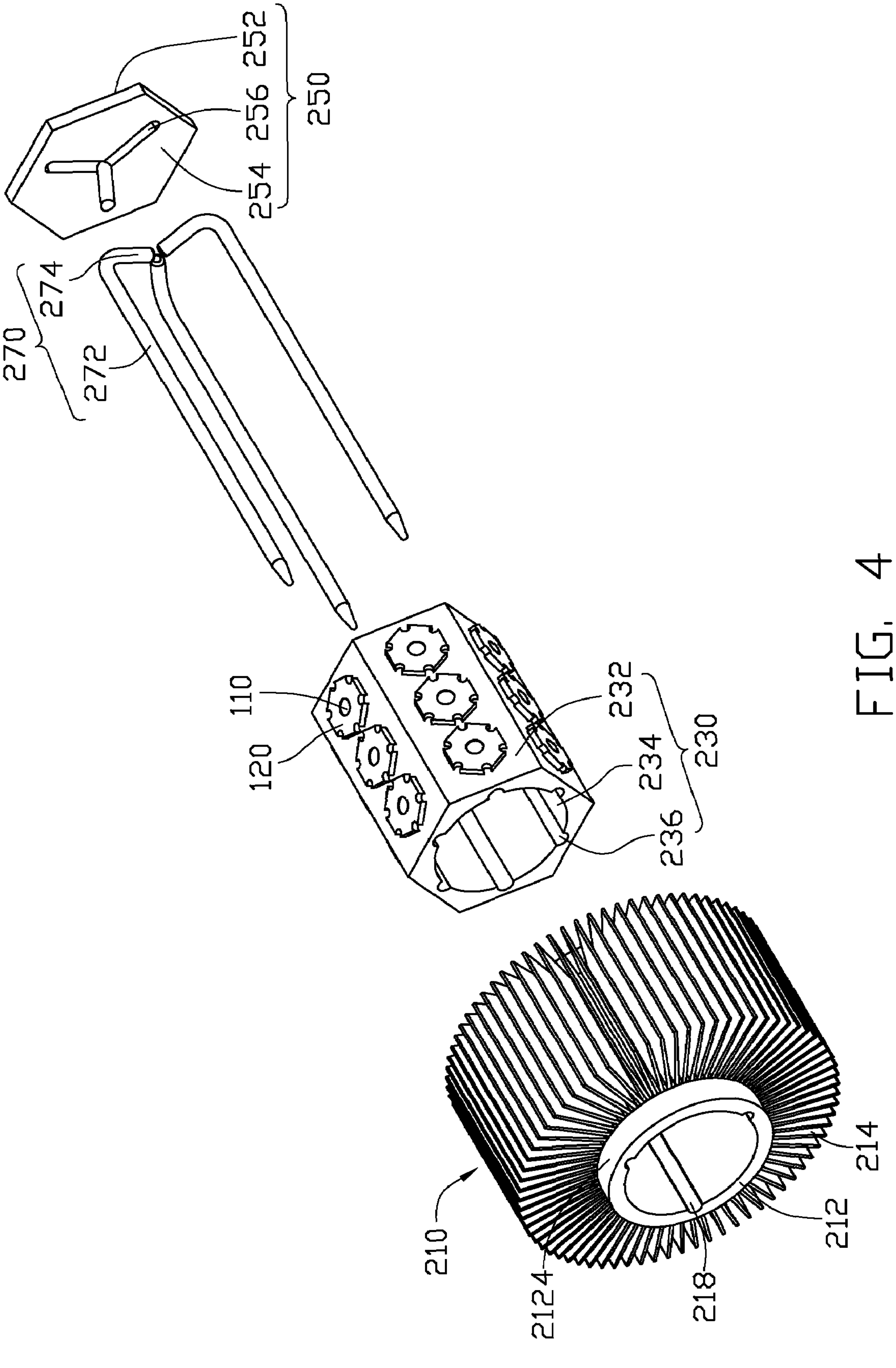
FIG. 4 is similar to FIG. 3, viewed from another aspect.

Referring to FIGS. 1-4, an LED lamp of a preferred embodiment of the invention comprises an LED module 100, a heat dissipation apparatus 200 for supporting and cooling the LED module 100, a reflector 300 mounted on the heat dissipation apparatus 200, and a bulb 400 attached to the reflector 300.

The reflector 300 is a bowl-shaped construction, having a concave upper surface (not labeled) and a hole (not visible) defined in a central portion of the reflector 300. The reflector 300 is used to reflect the light emitted from the LED module 100 upwardly. If desired, the reflector 300 may be omitted, and the bulb 400 may be directly attached to the heat dissipation apparatus 200.

The bulb 400 has an inner space (not labeled) for receiving the LED module 100 therein. The bulb 400 is generally made of transparent plastic, glass, or other suitable material. The bulb 400 is fitted over the reflector 300 for enabling the light emitted from the LED module 100 to pass through the bulb 400, while preventing dust, insect or the like from entering the bulb 400 to affect the service life of the LED module 100.

The LED module 100 generally comprises a plurality of LEDs 110 each mounted on a printed circuit board 120. The LEDs 110 are installed into the corresponding printed circuit boards 120 and electrically connected to the circuits (not shown) provide on the printed circuit boards 120. The printed circuit boards 120 are further electrically connected to a power (not shown) through wires (not shown) extending though the heat dissipation apparatus 200.

The heat dissipation apparatus 200 comprises a heat sink 210, a first heat conductor 230 vertically positioned above the heat sink 210, a second heat conductor 250 horizontally mounted on the first heat conductor 230, and three heat pipes 270 thermally connecting the second heat conductor 250, the first heat conductor 230 and the heat sink 210 in series.

The heat sink 210 comprises a hollow and cylindrical base 212 and a plurality of fins 214 extending radially and outwardly from an outer periphery of the hollow base 212. A plurality of channels 216 is defined between adjacent fins 214 for an airflow flowing therethrough. The base 212 has a top end portion 2122 above a top surface of the fins 214, and a bottom end portion 2124 below a bottom surface of the fins 214. The top end portion 2122 is extended through the though hole (not shown) of the reflector 300 into the inner space (not labeled) of the bulb 400, and the bottom end portion 2124 is connected to a lamp base (not shown) such as a supporting stand. Three channels 218 are symmetrically defined in an inner wall of the base 212, and extend along an axis direction of the base 212, for receiving parts of the heat pipes 270 respectively.

Each heat pipe 270 has an L-shaped configuration, with a first leg 272 and a second leg 274 perpendicularly bent and extending from an end of the first leg 272. The first leg 272 has a length longer than that of the second leg 274. One part, i.e. a lower part of the first leg 272 is received and retained in a corresponding channel 218 of the heat sink 210; another part, i.e. an upper part of the first leg 272 is attached to the first heat conductor 230. Furthermore, the second leg 274 is thermally attached to the second heat conductor 250. Thus, the heat pipes 270 thermally connect the heat sink 210, the first heat conductor 230 and the second heat conductor 250 in series.

The first heat conductor 230 and the second heat conductor 250 are positioned above the heat sink 210, for supporting and cooling the LED module 100.

The first heat conductor 230 is supported by and mounted on the heat sink 210. The first heat conductor 230 has a hollow structure, and has a hexagonal outer surface with six side surfaces 232 and a cylindrical inner surface 234. On each side surface 232 of the first heat conductor 230, there are three LEDs 110 with corresponding printed circuit boards 120 arranged in a line parallel to an axial direction of the first heat conductor 230. Six channels 236 are symmetrically defined in the inner surface 234 of the first heat conductor 230, and extend along the axial direction of the first heat conductor 230. Each channel 236 is corresponding to one side surface 232 of the first heat conductor 230, and is just beside the LEDs 110 mounted on the corresponding side surface 232. The channels 236 of the first heat conductor 230 are provided to receive and retain the upper parts of the first legs 272 of the heat pipes 270 therein.

The upper parts of the first legs 272 are symmetrically received in three channels 236 of the first heat conductor 230 with the lower parts of the first legs 272 received in the corresponding channels 218 of the heat sink 210. At the same time, the second legs 274 are located above the first heat conductor 230 and in thermal engagement with the second heat conductor 250.

The second heat conductor 250 has a hexagonal plate-like structure. The second heat conductor 250 comprises a top side 252 supporting three LEDs 110 with printed circuit boards 120 thereon, and a bottom side 254 attached to a top side of the first heat conductor 230. Three grooves 256 are radially defined in the bottom side 254 of the second heat conductor 250 and communicated with each other at a central area of the second heat conductor 250. In other words, the three grooves 256 extend radially and outwardly from the central area of the second heat conductor 250. Adjacent two grooves 256 define an angle of about 120 degrees therebetween. The second legs 274 of the heat pipes 270 are received and retained in the grooves 256 when the second heat conductor 250 is attached to the first heat conductor 230.

As mentioned above, the LEDs 110 with the corresponding printed circuit boards 120 are positioned on the top side 252 of the second heat conductor 250 and the side surfaces 232 of the first heat conductor 230, respectively. The LEDs 110 on the top side 252 of the second heat conductor 250 are oriented toward a direction which is perpendicular to that of the LEDs 110 on the side surfaces 232 of the first heat conductor 230. Thus, a three-dimensional light source is formed to increase illumination effect of the LED lamp.

The three-dimensional light source, including the first and second heat conductors 230, 250 and the LED module 100 are extended though the through holes of the reflector 300 and retained in the inner space of the bulb 400 to thereby form the LED lamp.

In operation, when the LEDs 110 are powered to produce light, heat produced by the LEDs 110 are first absorbed by the first and second heat conductors 230, 250. Then, the heat accumulated at the first and second heat conductors 230, 250 heats up and evaporates working fluid contained in the heat pipes 270. Sequentially, the evaporated working fluid flows towards the heat sink 210, conveys carried heat to the base 212 of the heat sink 210 and returns to liquid state. Finally, the heat at the base 212 is dissipated to surrounding environment via the fins 214. Thus, the heat produced by the LEDs 110 can be quickly transferred away via the heat pipes 270, and quickly dissipated via the heat sink 210. Therefore, the heat of the LEDs 110 is quickly removed away, and the LED lamp can work within an acceptable temperature range.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An LED lamp comprising:

a bulb;

an LED module comprising a plurality of LEDs received in the bulb;

a heat dissipation apparatus supporting and cooling the LED module, the heat dissipation apparatus comprising:

a heat sink having a hollow base and a plurality of fins mounted on the base;

a hollow first heat conductor supported by the heat sink;

a second heat conductor mounted on the first heat conductor;

a heat pipe thermally connecting the heat sink, the first heat conductor and the second heat conductor in series, the heat pipe having a first leg in contact with the heat sink and the first heat conductor, and a second leg extending from the first leg, the second leg contacting with the second heat conductor;

wherein the LEDs are positioned on the first heat conductor and the second heat conductor, respectively;

wherein the hollow first heat conductor has an inner surface with a channel defined thereon, and another part of the first leg of the heat pipe is retained in the channel of the first heat conductor.

2. The LED lamp as described in claim 1, wherein the base has an upper end portion extending above the fins, and the upper end portion extends into the bulb.

3. The LED lamp as described in claim 2, wherein the first heat conductor is mounted on the upper end portion.

4. The LED lamp as described in claim 3, wherein the base has a lower end portion extending below the fins, and the lower end portion is adapted for connection with a supporting stand.

5. The LED lamp as described in claim 4, wherein the upper and lower end portions are located at different sides of the heat sink.

6. The LED lamp as described in claim 1, wherein the base has a channel defined therein, and another part of the first leg of the heat pipe is retained in the channel of the base.

7. The LED lamp as described in claim 6, wherein the second heat conductor has a groove defined therein, and the second leg of the heat pipe is retained in the groove.

8. The LED lamp as described in claim 7, wherein the channel of the base is defined in an inner wall of the base, the first heat conductor is hollow and has an inner surface, and the channel of the first heat conductor is defined in the inner surface.

9. The LED lamp as described in claim 1, wherein the first heat conductor has a plurality of side surfaces, each side surface has some of the plurality of LEDs mounted thereon, and the first leg of the heat pipe extends in the first heat conductor beside the some of the LEDs on a corresponding side surface of the first heat conductor.

10. The LED lamp as described in claim 1, further comprising a reflector mounted on the heat sink, and the bulb is attached to the reflector.

11. The LED lamp as described in claim 1, wherein the LEDs mounted on the first heat conductor are oriented toward a first direction, the LEDs mounted on the second heat conductor are oriented toward a second direction, and the first direction is different from the second direction.

12. The LED lamp as described in claim 11, wherein the first direction is perpendicular to the second direction.

13. The LED lamp of claim 1, wherein the heat pipe has an L-shaped configuration.

14. The LED lamp of claim 13, wherein the second leg extends perpendicularly from an end of the first leg.

15. An LED lamp comprising:

a bulb;

an LED module comprising a plurality of LEDs received in the bulb;

a heat dissipation apparatus supporting and cooling the LED module, the heat dissipation device comprising:

a heat sink having a base and a plurality of fins mounted on the base;

a hollow first heat conductor vertically supported by the heat sink;

a second heat conductor horizontally mounted on the first heat conductor;

a plurality of heat pipes each having a first leg in contact with the base and the first heat conductor, a second leg bent from the first leg and in contact with the second heat conductor;

wherein the LEDs are positioned on the first heat conductor and the second heat conductors, respectively;

wherein a plurality of channels is defined on an inner surface of the hollow first heat conductor, each heat pipe having a part of the first leg retained in a corresponding channel of the first heat conductor.

16. The LED lamp as described in claim 15, wherein the second heat conductor has a plurality of grooves defined therein, and the second legs of the heat pipes are retained in the grooves, respectively.

17. The LED lamp as described in claim 16, wherein the grooves radially and outwardly extend from a central point of the second heat conductor.

18. The LED lamp as described in claim 16, wherein the base and the first heat conductor are hollow structure, a plurality of channels is defined in inner surfaces of the base, and each heat pipe has another part of the first leg retained in a corresponding channel of the base of the heat sink.

19. The LED lamp of claim 15, wherein each heat pipe has an L-shaped configuration.

20. The LED lamp of claim 19, wherein the second leg of each heat pipe extends perpendicularly from an end of the first leg.

* * * * *